United States Patent
Je et al.

(10) Patent No.: US 6,482,494 B2
(45) Date of Patent: Nov. 19, 2002

(54) HEMICYANINE DYES AND OPTICAL RECORDING MEDIA USING THE SAME

(75) Inventors: Jong-tae Je, Seoul (KR); Kyu-youn Lee, Seoul (KR); Young-jae Huh, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 71 days.

(21) Appl. No.: 09/824,136

(22) Filed: Apr. 3, 2001

(65) Prior Publication Data

US 2001/0053429 A1 Dec. 20, 2001

(30) Foreign Application Priority Data

May 3, 2000 (KR) .............................. 00-23733

(51) Int. Cl.$^7$ ................................. B32B 3/02
(52) U.S. Cl. .................... 428/64.1; 428/64.8; 430/270.2
(58) Field of Search ............... 428/64.1, 64.4, 428/64.8, 913; 430/270.14, 270.2, 495.1, 945; 369/283, 288

(56) References Cited

U.S. PATENT DOCUMENTS

| | | | | |
|---|---|---|---|---|
| 3,764,317 A | * | 10/1973 | Depoorter ................ | 430/270.2 |
| 4,626,490 A | | 12/1986 | Yamazaki et al. | |
| 4,883,741 A | * | 11/1989 | Takahashi .................... | 430/270 |
| 4,900,648 A | * | 2/1990 | Hioka ........................ | 430/270 |
| 5,272,047 A | | 12/1993 | Kovacs et al. | |
| 5,441,844 A | | 8/1995 | Shimoda | |
| 6,338,888 B1 | * | 1/2002 | Takase ...................... | 428/64.1 |

FOREIGN PATENT DOCUMENTS

| | | |
|---|---|---|
| DE | 17 72 286 A | 5/1970 |
| DE | 22 15 829 A | 10/1972 |
| EP | 0 224 261 A2 | 6/1987 |
| EP | 0 483 387 A1 | 5/1992 |
| EP | 0 528 512 A1 | 2/1993 |
| EP | 0 676 751 | 10/1995 |
| EP | 9 837 460 A1 | 4/1998 |
| EP | 1 092 753 A1 | 4/2001 |
| JP | 58-125246 | 7/1983 |
| JP | 9-157301 | 6/1997 |
| JP | 9-208560 | 8/1997 |
| JP | 10-149583 | 6/1998 |
| JP | 10-157293 | 6/1998 |

\* cited by examiner

*Primary Examiner*—Elizabeth Mulvaney
(74) *Attorney, Agent, or Firm*—Burns, Doane, Swecker & Mathis, LLP

(57) ABSTRACT

A hemicyanine dye having formula (1) and an optical recording medium using the hemicyanine dye as an optical recording medium are provided:

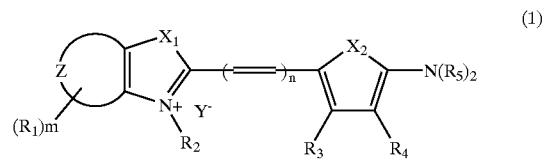

wherein Z is a benzene ring, naphthalene ring or anthracene ring; $X_1$ is S, O, Se, NR or $C(CH_3)_2$; $X_2$ is S, NR or O, where R is hydrogen or an alkyl group of 1 to 5 carbon atoms; $R_1$ is hydrogen, halogen atoms, an alkyl group of 1 to 3 carbon atoms or a nitro group; each of $R_2$ and $R_5$ is an alkyl group of 1 to 5 carbon atoms; each of $R_3$ and $R_4$ is hydrogen, an hydroxy group, an alkyl group of 1 to 4 carbon atoms, halogen atoms or a halide; Y is Cl, Br, I, $ClO_4$, $BF_4$, $BrO_4$, $PF_6$, $CH_3SO_3$, $CF_3SO_3$, $4\text{-}CH_3C_6H_4SO_3$, $C_6H_5SO_3$, $6\text{-}SO_3C_{10}H_6SO_3$ or $HSO_4$; n is an integer of 0-2; and m is an integer of 1-2. The hemicyanine dye having formula (1) above is easy to synthesize with high yield. Thus, use of the hemicyanind dye as an optical recording medium is advantageous in terms of the manufacturing costs. An optical recording medium using the hemicyanine dye has improved recording characteristics in terms of jitter and modulation factor.

6 Claims, 1 Drawing Sheet

FIG. 1

HEMICYANINE DYES AND OPTICAL RECORDING MEDIA USING THE SAME

This application claims priority under 35 U.S.C. §§119 and/or 365 to Application No. 00-23733 filed in Korea on May 3, 2000; the entire content of which is hereby incorporated by reference.

BACKGROUND OF THE INVENTION

1. Field of the Invention

The present invention relates to hemicyanine dyes and optical recording media formed using a hemicyanine dye as an optical recording material, and more particularly, to hemicyanine dyes, and a write only read many (WORM) optical recording medium capable of recording and reproducing information by laser, which employs a hemicyanine dye as an optical recording material.

2. Description of the Related Art

Optical recording media have a smaller recording area per recording unit than conventional magnetic recording media, so that use of optical recording media as a high density recording medium is extensively increasing. Optical recording media are classified into a read only memory (ROM) type for only reading recorded information, a write once read many (WORM) type which allows only one writing, and an erasable type which allows erasing of recorded information and rewriting.

Recordable optical recording media record and reproduce information by detecting variations in the reflectivity caused by physical deformation and changes in phase and magnetic properties of a recording layer before and after the recording.

A compact disk recordable (CD-R) is widely known as a WORM type optical recording medium. In addition, a variety of optical recording materials, which ensure easy manufacture of such a recording medium with improved properties, have been suggested and some of them are in use. Disclosed optical recording materials for CD-Rs include a cyanine dye (Japanese Patent Publication No. sho 58-125246), a phthalocyanine dye (European Patent No. 676,751), an azo dye (U.S. Pat. No. 5,441,844), a dye of double salt (U.S. Pat. No. 4,626,490) and a dye of azo-metal complex (U.S. Pat. No. 5,272,047).

Recently, with increased amount of information, a digital versatile disk recordable (DVD-R) with increased information storing capability has been suggested. The DVD-R adopts a red diode laser having a wavelength of 630–690 nm, as a light source, and has reduced pit size and track interval, so that its information storing capacity is 6–8 times increased to CD-Rs, with improved recording density. Optical recording materials suitable for DVD-Rs needs a high reflectivity and good absorption at the recording wavelength, and good solubility in an organic solvent. In addition, the synthesis of optical recording materials must be easy with low costs. Examples of such optical recording materials for DVD-Rs include a cyanine dye (Japanese Patent Publication Nos. hei 10-149583 and hei 9-208560) and an azo-metal complex (Japanese Patent Publication Nos. hei 10-157293 and hei 9-157301). However, it would be desirable to improve the characteristics of the conventional dyes.

SUMMARY OF THE INVENTION

To solve the above problems, it is a first objective of the present invention to provide a novel hemicyanine dye which is easy to synthesize with high yield.

A second objective of the present invention is to provide an optical recording medium with improved recording characteristics, which is manufactured using the hemicyanine dye as an inexpensive optical recording material.

The first objective of the present invention is achieved by a hemicyanine dye having formula (1):

(1)

wherein Z is a benzene ring, naphthalene ring or anthracene ring; $X_1$ is S, O, Se, NR or $C(CH_3)_2$; $X_2$ is S, NR or O, where R is hydrogen or an alkyl group of 1 to 5 carbon atoms; $R_1$ is hydrogen, halogen atoms, an alkyl group of 1 to 3 carbon atoms or a nitro group; each of $R_2$ and $R_5$ is an alkyl group of 1 to 5 carbon atoms; each of $R_3$ and $R_4$ is hydrogen, an hydroxy group, an alkyl group of 1 to 4 carbon atoms, halogen atoms or a halide; Y is Cl, Br, I, $ClO_4$, $BF_4$, $BrO_4$, $PF_6$, $CH_3SO_3$, $CF_3SO_3$, $4\text{-}CH_3C_6H_4SO_3$, $C_6H_5SO_3$, $6\text{-}SO_3C_{10}H_6SO_3$ or $HSO_4$; n is an integer of 0–2; and m is an integer of 1–2.

The second objective of the present invention is achieved by an optical recording medium comprising a transparent substrate with grooves, a recording layer including a laser absorptive dye, formed over the transparent substrate, and a reflective layer and a protective layer formed over the recording layer, wherein the dye of the recording layer is a hemicyanine dye having formula (1):

(1)

wherein Z is a benzene ring, naphthalene ring or anthracene ring; $X_1$ is S, O, Se, NR or $C(CH_3)_2$; $X_2$ is S, NR of O, where R is hydrogen or an alkyl group of 1 to 5 carbon atoms; $R_1$ is hydrogen, halogen atoms, an alkyl group of 1 to 3 carbon atoms or a nitro group; each of $R_2$ and $R_5$ is an alkyl group of 1 to 5 carbon atoms; each of $R_3$ and $R_4$ is hydrogen, an hydroxy group, an alkyl group of 1 to 4 carbon atoms, halogen atoms or a halide; Y is Cl, Br, I, $ClO_4$, $BF_4$, $BrO_4$, $PF_6$, $CH_3SO_3$, $CF_3SO_3$, $4\text{-}CH_3C_6H_4SO_3$, $C_6H_5SO_3$, $6\text{-}SO_3C_{10}H_6SO_3$ or $HSO_4$; n is an integer of 0–2; and m is an integer of 1–2.

BRIEF DESCRIPTION OF THE DRAWING

The above objectives and advantages of the present invention will become more apparent by describing in detail a preferred embodiment thereof with reference to the attached drawings in which.

DETAILED DESCRIPTION OF THE INVENTION

In a hemicyanine dye having formula (1) according to the present invention, Z is a benzene ring, a naphthalene ring or an anthracene ring.

(I)

Apparently, in formula (1), the portion (I) including the ring indicated by Z represents a condensed ring formed by covalently coupling at least two atoms between a octagonal ring compound selected from the group consisting of thiazole ring, oxazole ring and imidazole ring, and one of the benzene ring, naphthalene ring and anthracene ring. The concrete examples of the portion (I) are as follows.

wherein Z is a benzene ring, naphthalene ring or anthracene ring; $X_1$ is S, O, Se, NR or $C(CH_3)_2$; $X_2$ is S, NR of O, where R is hydrogen or an alkyl group of 1 to 5 carbon atoms; $R_1$ is hydrogen, halogen atoms, an alkyl group of 1 to 3 carbon atoms or a nitro group; each of $R_2$ and $R_5$ is an alkyl group of 1 to 5 carbon atoms; each of $R_3$ and $R_4$ is hydrogen, an hydroxy group, an alkyl group of 1 to 4 carbon atoms, halogen atoms or a halide; Y is Cl, Br, I, $ClO_4$, $BF_4$, $BrO_4$, $PF_6$, $CH_3SO_3$, $CF_3SO_3$, $4\text{-}CH_3C_6H_4SO_3$, $C_6H_5SO_3$, $6\text{-}SO_3C_{10}H_6SO_3$ or $HSO_4$; n is an integer of 0–2; and m is an integer of 1–2.

Preferably, the hemicyanine dye having formula (1) is a compound having formula (2) or (3) below:

wherein $R_1$ is H, $NO_2$ or Cl; $R_2$ is $CH_3$, $C_2H_5$, $C_3H_7$ or $C_4H_9$; $X_1$ is $C(CH_3)_2$ or S; $X_2$ is O or S; $R_5$ is $C_2H_5$, $C_3H_7$ or $C_4H_9$; and Y is $ClO_4$, $BF_4$, $PF_6$, I, Br or Cl, and wherein $X_1$ is $C(CH_3)_2$ or S; $X_2$ is S; $R_2$ is $CH_3$, $C_2H_5$, $C_3H_7$ or $C_4H_9$; $R_5$ is $C_2H_5$, $C_3H_7$ or $C_4H_9$; and Y is $ClO_4$, $BF_4$, $PF_6$, I, Br or Cl.

The synthesis of the novel hemicyanine dye having formula (1) according to the present invention will be described with reference to the following reaction scheme (I). The hemicyanine dye having formula (1) is obtained by condensing compound (A) with compound (B). Each of the compounds (A) and (B) can be derived by the following process illustrated in reaction scheme (I).

Compound (A) is derived by reacting compound (A-1) with excess halogen compound, for example, iodomethane, iodoethane, iodopropane, iodobutane. Compound (B) can be derived by reacting compound (B-1) with a secondary amine.

An optical recording medium according to the present invention, which is manufactured using the hemicyanine dye having formula (1) as an optical recording material, is a write once read many (WORM) type optical recording medium using a laser beam, and particularly, is a DVD-R using a short wavelength laser beam as a light source.

Figure 1:
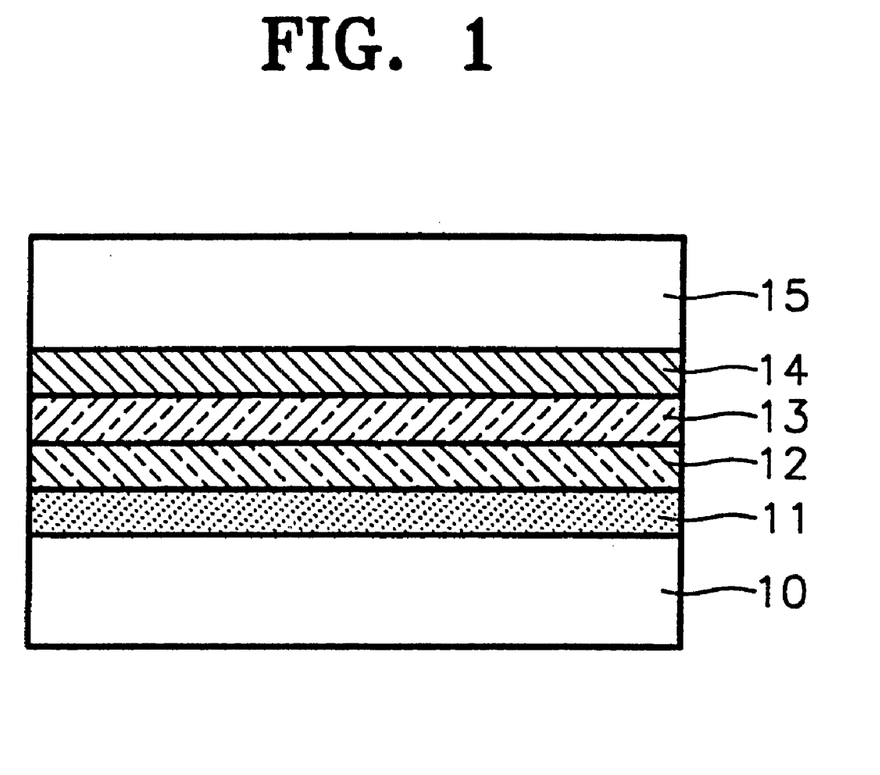
FIG. 1 is a sectional view illustrating the structure of layers stacked in an optical recording medium according to a preferred embodiment of the present invention.

FIG. 1 is a sectional view illustrating the structure of layers stacked in an optical recording medium according to the present invention. Referring to FIG. 1, a recording layer 11, which contains the hemicyanine dye having formula (1) above used as an optical recording medium, a reflective layer 12 and a protective layer 13 are deposited in succession over a semiconductor substrate 10.

For certain cases, a dummy substrate 15 can be attached to the optical recording medium using an adhesive layer 14. Alternatively, the optical recording medium of FIG. 1 can be combined with another optical recording medium having the same or different structure as or from that of FIG. 1. A material used for the adhesive layer 14 may be a ultraviolet (UV) curable resin, or a cationic curable resin. Also, such combination with an adhesive layer can be performed using a two-sided adhesive sheet, or by a hot-melting, spin coating, dispensing (extrusion), screen printing, or roll-coat method.

Preferably, the substrate 10 is formed of a material, which is transparent to a laser beam and easy to swell by heat, and has a strong impact resistance. Suitable materials for the substrate 10, which meet the requirements, include polycarbonate, polymethacrylate, epoxy resin, polyester resin and polyolefin resin. These materials used for the substrate 10 have a thermal deformation temperature in the range of 80–200° C., but preferably in the range of 100–200° C.

Pregrooves for guiding an incident laser beam during recording or reproducing are formed on the surface of the substrate 10. Preferably, the pregrooves have a depth of 80–250 nm, and a width of 200–500 $\mu$m. Preferably, the substrate 10 has a transmittance of 60–99%, with about 90% being preferred, and a thickness of 0.01–10 mm. If the transmittance or thickness of the substrate is beyond the above range, the optical recording medium characteristics are unfavorable.

The recording layer 11 includes an organic dye which is physically deformed and decomposed by a recording laser beam. In the present invention, the recording layer 11 may include at least one hemicyanine dye having formula (1). As needed, the recording layer 11 can further include a singlet oxygen quencher, a light absorptive material and a radical scavenger. Preferably, the optical recording material used in the recording layer 11 has a complex refractive index, including a real part coefficient n of 1.5–2.8 and an imaginary part coefficient k of 0.01–0.4 in the wavelength range for recording and reproduction. More preferably, the optical recording material has a refractive index of 1.8–2.3 in a wavelength range of 400–700 nm. Preferably, the optical recording medium has a maximum absorption wavelength of 350–650 nm. If the complex refractive index and the maximum absorption wavelength of the optical recording material are beyond the above ranges, recording and reproducing characteristics in terms of recording sensitivity, push-pull, tracking and modulation factor are unfavorable.

The recording layer 11 is formed by spin coating a composition over a substrate. The composition for the recording layer 11 is obtained by dissolving 0.5–10% by weight hemicyanine dye having formula (1) in a solvent of 90–99.5% by weight based on the total weight of the composition. Any solvent capable of dissolving the hemicyanine dye can be used without limitations.

Preferably, the reflective layer 12, which ensures high reflectivity for recording or reproducing, is formed of a metal having a high reflectivity as well as a high thermal conductivity, such that the reflective layer 12 is not susceptible to deform. Suitable metals used for the reflective layer 12 include gold (Au), aluminum (Al), silver (Ag), copper (Cu), palladium (Pd), platinum (Pt), titanium (Ti), tantalum (Ta), chromium (Cr), nickel (Ni) or an alloy of these metals. Preferably, the reflective layer 12 has a thickness of 500–2500 Å. The reflective layer 12 may be formed by vacuum deposition, E-beam or sputtering.

In the present invention, the protective layer 13 serves to protect other constituents layers, and in particular, the reflective layer 12 of the optical recording medium. The protective layer 13 is formed by a common method. For example, a transparent UV curable material with strong impact resistance, such as epoxy or acrylate UV curable resin is spin-coated over the reflective layer 12, and then cured by radiation of UV rays.

The present invention will be described in greater detail by means of the following examples. The following examples are for illustrative purposes and are not intended to limit the scope of the invention.

Synthesis Example 1

1 Equivalent 5-bromo-2-thiophenecarboxaldehyde was dissolved in dimethylformamide, and 1–2 drops of Aliquart 336 (tricaprylylmethylammonium chloride, produced by Aldrich) was dropwise added to the solution. 10 Equivalents diethyl amine was added to the mixture and refluxed at 110° C. for 5 days.

The reaction mixture was evaporated in a vacuum to remove the solvent, and the residue was extracted with ether. The ether portion was concentrated and purified by silicagel chromatography (using a mixed solvent containing hexane and ethylacetate in a ratio of 3:1 by volume as an eluent) to obtain 5-diethylamino-2-thiophenenecarboxaldehyde of orange color with a yield of 80%.

1 Equivalent 2,3,3-trimethylindolene and 10 equivalents iodomethane were dissolved in ethylacetate, and refluxed at 50° C. As a result, when excess reaction product was precipitated, the precipitate was filtered and washed with ethyl acetate several times, so that 1-methyl-2,3,3-trimethylpseudoindolium iodide was obtained with a yield of 90%.

1.2 Equivalents 5-diethylamino-2-thiophenecarboxaldehyde and 1 equivalent 1-methyl-2,3,3-trimethylpseudoindolium iodide were dissolved in ethanol while stirring. Then, 1 drop of piperidine was added. The reaction mixture was refluxed for 5 hours and evaporated under vacuum to remove the solvent. Then, excess ethyl acetate was added to the resultant mixture, so that violet powder was precipitated. The precipitate was washed with ethyl acetate several times, so that dye D1 of violet color having the following formula was obtained with a yield of 80%.

0.3 g of the dye D1 was dissolved in 10 ml tetrafluoropropanol, and spin-coated over a substrate to form a dye thin film. The absorption spectrum of the obtained thin film was observed with UV-VIS-NIR spectrophotometer (UV-3101PC, Shimadzu Co.). As a result, the maximum absorption peak ($\lambda_{max}$) of dye D1 was shown at 590 nm.

NMR (DMSO, ppm): 1.28 (t, 6H), 1.68 (s, 6H), 3.68 (q, 4H), 3.96 (s, 3H), 6.08 (d, 1H), 6.76 (d, 1H), 7.42 (t, 1H), 7.64 (t, 1H), 7.82 (d, 1H), 7.90 (d, 1H), 8.04 (d, 1H), 8.36 (d, 1H)

Synthesis Example 2

2-Methylene-1,3,3-trimethyleneindoline was dissolved in ethyl acetate and a HCl solution was dropwise added to the solution. The precipitate was filtered from the reaction mixture and washed with ethyl acetate several times to obtain 1,2,3,3,-tetramethylpseudoindolium chloride.

Dye D1 of violet color having the following formula was obtained with a yield of 85%) in the same way as in Synthesis Example 1, except that 1,2,3,3,-tetramethylpseudoindolium chloride was used instead of 1-methyl-2,3,3-trimethylpseudoindolium iodide of Synthesis Example 1.

The maximum absorption peak ($\lambda_{max}$) of dye D2 was observed by the same method as in Synthesis Example 1. As a result, $\lambda_{max}$ of dye D2 was shown at 586 nm.

NMR (DMSO, ppm): 1.28 (t, 6H), 1.68 (s, 6H), 3.68 (q, 4H), 3.96 (s, 3H), 6.08 (d, 1H), 6,76 (d, 1H), 7.42 (t, 1H), 7.64 (t, 1H), 7.82 (d, 1H), 7.90 (d, 1H), 8.04 (d, 1H), 8.36 (d, 1H)

Synthesis Examples 3 through 7

Dyes D3, D4, D5, D6 and D7 having the following formula were obtained in the same way as in Synthesis Example 2, except that HCl used in Synthesis Example 2 was replaced by HBr, $H_2SO_4$, $HClO_4$, $HBF_4$ and $HPF_6$, respectively, for Synthesis Examples 3 through 7. The yields of dyes D3, D4, D5, D6 and D7 were 70%, 75%, 75%, 70% and 75%, respectively.

In the formula above, Y is Br for dye D3, $ClO_4$ for dye D4, $HSO_4$ for dye D5, $BF_4$ for dye D6, and $PF_6$ for dye D7.

The maximum absorption peaks ($\lambda_{max}$) of dyes D3, D4, D5, D6 and D7 were observed by the same method as in Synthesis Example 1. As a result, $\lambda$max was 590 nm for dye D3, 586 nm for dye D4, 589 nm for dye D5, 589 nm for dye D6, and 590 nm for dye D7.

<Dye D3>
NMR (DMSO, ppm): 1.28 (t, 6H), 1.68 (s, 6H), 3.68 (q, 4H), 3.96 (s, 3H), 6.08 (d, 1H), 6.76 (d, 1H), 7.42 (t, 1H), 7.64 (t, 1H), 7.82 (d, 1H), 7.90 (d, 1H), 8.04 (d, 1H), 8.36 (d, 1H)
<Dye D4>
NMR (DMSO, ppm): 1.28 (t, 6H), 1.68 (s, 6H), 3.68 (q, 4H), 3.96 (s, 3H), 6.08 (d, 1H), 6.76 (d, 1H), 7.42 (t, 1H), 7.64 (t, 1H), 7.82 (d, 1H), 7.90 (d, 1H), 8.04 (d, 1H), 8.36 (d, 1H)
<Dye D5>
NMR (DMSO, ppm): 1.28 (t, 6H), 1.68 (s, 6H), 3.68 (q, 4H), 3.96 (s, 3H), 6.08 (d, 1H), 6.76 (d, 1H), 7.42 (t, 1H), 7.64 (t, 1H), 7.82 (d, 1H), 7.90 (d1H), 8.04 (d, 1H), 8.36 (d, 1H)
<Dye D6>
NMR (DMSO, ppm): 1.28 (t, 6H), 1.68 (s, 6H), 3.68 (q, 4H), 3.96 (s, 3H), 6.08 (d, 1H), 6.76 (d, 1H), 7.42 (t, 1H), 7.64 (t, 1H), 7.82 (d, 1H), 7.90 (d,1H), 8.04 (d, 1H), 8.36 (d, 1H)
<Dye D7>
NMR (DMSO, ppm): 1.28 (t, 6H), 1.68 (s, 6H), 3.68 (q, 4H), 3.96 (s, 3H), 6.08 (d, 1H), 6.76 (d, 1H), 7.42 (t, 1H), 7.64 (t, 1H), 7.82 (d, 1H), 7.90 (d, 1H), 8.04 (d, 1H), 8.36 (d, 1H)

Synthesis Example 8

Dye D8 having the following formula was obtained with a yield of 75% in the same way as in Synthesis Example 2, except that 5-chloro-1,2,3,3,-tetramethylpseudoindolium chloride was used instead of 1-methyl-2,3,3-trimethylpseudoindolium iodide of Synthesis Example 1.

The maximum absorption peak ($\lambda_{max}$) of dye D8 was observed by the same method as in Synthesis Example 1. As a result, $\lambda_{max}$ was 596 nm for dye D8.

NMR (DMSO, ppm): 1.28 (t, 6H), 1.68 (s, 6H), 3.62 (s, 3H), 3.70 (q, 4H), 6.02 (d, 1H), 6.82 (d, 1H), 7.40 (d, 1H), 7.46 (d, 1H), 7.74 (s, 1H), 8.10 (d, 1H), 8.20 (d, 1H)

Synthesis Examples 9 through 11

Dyes D9, D10 and D11 having the following formula were obtained in the same way as in Synthesis Example 2, except that 5-chloro-2-methylene-1,3,3-trimethylindoline was used instead of 2-methylene-1,3,3-trimethylene indoline, and HCl used in Synthesis Example 2 was replaced by $HClO_4$, $HBF_4$ and $HPF_6$, respectively, for Synthesis Examples 9 through 11. The yields of Dyes D9, D10 and D11 were 70%, 75% and 75%, respectively.

In the formula above, Y is $ClO_4$ for dye D9, $BF_4$ for dye D10, and $PF_6$ for dye D 11.

The maximum absorption peaks ($\lambda_{max}$) of dyes D9, D10 and D11 were observed by the same method as in Synthesis Example 1. As a result, $\lambda_{max}$, was 597 nm for dye D9, 599 nm for dye D10 and 598 nm for dye D11.

<Dye D9>
NMR (DMSO, ppm): 1.28 (t, 6H), 1.68 (s, 6H), 3.62 (s, 3H), 3.70 (q, 4H), 6.04 (d, 1H), 6.82 (d, 1H), 7.40 (d, 1H), 7.46 (d, 1H), 7.76 (s, 1H), 8.06 (d, 1H), 8.36 (d, 1H)

<Dye D10>
NMR (DMSO, ppm): 1.28 (t, 6H), 1.68 (s, 6H), 3.62 (s, 3H), 3.70 (q, 4H), 6.04 (d, 1H), 6.82 (d, 1H), 7.40 (d, 1H), 7.46 (d, 1H), 7.76 (s, 1H), 8.06 (d, 1H), 8.36 (d, 1H)

<Dye D11>
NMR (DMSO, ppm): 1.28 (t, 6H), 1.68 (s, 6H), 3.62 (s, 3H), 3.70 (q, 4H), 6.04 (d, 1H), 6.82 (d, 1H), 7.40 (d, 1H), 7.46 (d, 1H), 7.76 (s, 1H), 8.06 (d, 1H), 8.36 (d, 1H)

Synthesis Example 12

1 Equivalent 2,3,3,-trimethyl-4,5-benzo-3H-indoline and 10 equivalents iodomethane were dissolved in ethyl acetate and refluxes at 50° C. When excess reaction product was precipitated, the precipitate was filtered and washed with ethyl acetate several times to obtain 1,2,3,3-tetramethyl-4,5-benzo-pseudindolium iodide.

Dye D12 of violet color was obtained with a yield of 80% by the same method as in Synthesis Example 1, except that 1-methyl-2,3,3-trimethylpseudoindolium iodide was replaced by 1,2,3,3-tetramethyl-4,5-benzopseudoindolium iodide.

The maximum absorption peak ($\lambda_{max}$) of dye D12 was observed by the same method as in Synthesis Example 1. As a result, $\lambda_{max}$ was 620 nm for dye D12.

NMR (DMSO, ppm): 1.28 (t, 6H), 1.92 (s, 6H), 3.68 (q, 4H), 3.78 (s, 3H), 6.12 (d, 1H), 6.72 (d, 1H), 7.52 (t, 1H), 7.66 (t, 1H), 7.74 (d, 1H), 8.02 (d, 1H), 8.08 (d, 1H), 8.12 (d, 1H), 8.26 (d, 1H), 8.48 (d, 1H)

Synthesis Example 13

1,2,3,3-tetramethyl-4,5-benzopseudoindolium iodide obtained in Synthesis Example 12 was dissolved in 2M NaOH solution, and ethyl acetate was added to the solution and stirred for 2 minutes. The ethyl acetate portion was separated from the reaction mixture and $HClO_4$ solution was added to the separated ethyl acetate portion. The precipitate of the reaction mixture was filtered and washed with ethyl acetate several times to obtain 1,2,3,3-tetramethyl4,5-benzopseudolium perchlorate.

Dye D13 having the following formula was obtained with a yield of 80% in the same way as in Synthesis Example 1, except that 1-methyl-2,3,3-trimethylpseudoindolium iodide used in Synthesis Example 1 was replaced by 1,2,3,3-tetramethyl-4,5-benzopseudoindolium perchlorate.

The maximum absorption peak ($\lambda_{max}$) of dye D13 was observed by the same method as in Synthesis Example 1. As a result, $\lambda_{max}$ was 618 nm for dye D13.

NMR (DMSO, ppm): 1.28 (t, 6H), 1.92 (s, 6H), 3.68 (q, 4H), 3.78 (s, 3H), 6.12 (d, 1H), 6.72 (d, 1H), 7.52 (t, 1H), 7.66 (t, 1H), 7.74 (d, 1H), 8.02 (d, 1H), 8.08 (d, 1H), 8.12 (d, 1H), 8.26 (d, 1H), 8.48 (d, 1H)

Synthesis Example 14

Dye 14 having the following formula was obtained in the same way as in Synthesis Example 1, except that 2-methylbenzothiazole and iodoethane were used instead of 2,3,3-trimethylidolenine and iodomethane used in Synthesis Example 1, respectively. The yield of dye D14 was 80%.

The maximum absorption peak ($\lambda_{max}$) of dye D14 was observed by the same method as in Synthesis Example 1. As a result, $\lambda_{max}$ was 558 nm for dye D14.

NMR (DMSO, ppm): 1.28 (t, 6H), 1.34 (t, 3H), 3.60 (q, 4H), 4.56 (q, 2H), 6.56 (d, 1H), 6.64 (d, 1H), 7.45 (t, 1H), 6.40 (t, 1H), 7.86 (d, 2H), 8.08 (d, 1H), 8.10 (d, 1H)

Synthesis Example 15

Dye D15 having the following formula, where R is $C_3H_7$, was obtained in the same way as in Synthesis Example 1, except that iodopropane and 2-methylbenzothiazole were used instead of iodomethane and 2,3,3-trimethylidolenine used in Synthesis Example 1, respectively. The yield of dye D15 was 75%.

The maximum absorption peak ($\lambda_{max}$) of dye D15 was observed by the same method as in Synthesis Example 1. As a result, $\lambda_{max}$ was 560 nm for dye D15.

NMR (DMSO, ppm): 1.20 (t, 6H), 1.24 (t, 3H), 1.30 (q, 2H), 3.50 (q, 4H), 4.32 (q, 2H), 6.26 (d, 1H), 6.52 (d, 1H), 7.60 (t, 1H), 7.72 (t, 1H), 7.92 (d, 1H), 8.02 (d, 1H), 8.18 (d, 1H), 8.30 (d, 1H)

Synthesis Examples 16 through 18

1 Equivalent 2-methylene-1,3,3-trimethylindoline, and 10 equivalents acid mixture, which contained sulfuric acid and nitric acid in a ratio of 2:1 by equivalent, were mixed and stirred for 30 minutes. The reaction product was neutralized by slowly adding saturated NaOH solution. The precipitate of orange color was filtered from the reaction mixture and dissolved in ethyl acetate. Triethylamine was added to the solution to obtain a neutral organic substance and then extracted with ethyl acetate. Next, 5-nitro-1,2,3,3-tetramethylpseudoindolium perchlorate, 5-nitro-1,2,3,3-tetramethylpseudoindolium tetrafluoroborate and 5-nitro-1,2,3,3-tetramethylpseudoindolium hexafluorophosphorate were derived from the product with $HClO_4$ solution, $HBF_4$ solution and $HPF_6$ solution, respectively. Dyes D16, D17 and D18 having the following formula were obtained by the same manner as in Synthesis Example 1, except that the derived products were used instead of 1-methyl-2,3,3-trimethylpseudoindolium iodide of Synthesis Example 1. The yields of Dyes D16, D17 and D18 were 75%.

In the formula above, Y is $ClO_4$ for dye D16, $BF_4$ for dye D17, and $PF_6$ for dye D18.

The maximum absorption peak ($\lambda_{max}$) of dye D16 was observed by the same method as in Synthesis Example 1. As a result, $\lambda_{max}$ was 608 nm for dye D16, 608 nm for dye D17 and 609 nm for dye D18.

<Dye D16>
NMR (DMSO, ppm): 1.25 (t, 6H), 1.70 (s, 6H), 3.60 (s, 3H), 3.78 (q, 4H), 6.04 (d, 1H), 7.02 (d, 1H), 7.46 (d, 1H), 8.14 (d, 1H), 8.30 (d, 1H), 8.40 (d, 1H), 8.48 (s, 1H)

<Dye D17>
NMR (DMSO, ppm): 1.25 (t, 6H), 1.70 (s, 6H), 3.60 (s, 3H), 3.78 (q, 4H), 6.04 (d, 1H), 7.02 (d, 1H), 7.46 (d, 1H), 8.14 (d, 1H), 8.30 (d, 1H), 8.40 (d, 1H), 8.48 (s, 1H)

<Dye D18>
NMR (DMSO, ppm): 1.25 (t, 6H), 1.70 (s, 6H), 3.60 (s, 3H), 3.78 (q, 4H), 6.04 (d, 1H), 7.02 (d, 1H), 7.46 (d, 1H), 8.14 (d, 1H), 8.30 (d, 1H), 8.40 (d, 1H), 8.48 (s,1H)

Synthesis Example 19

1 Equivalent 5-bromo-2-thiophenecarboxaldehyde was dissolved in dimethylformamide, and 1–2 drops of Aliquart 336 (tricaprylylmethylammonium chloride, produced by Aldrich) was dropwise added to the solution. 10 Equivalents dipropylamine was added to the mixture and refluxed for 7 days. Next, dipropylamine was removed from the reaction mixture, and subjected to extraction and column chromatography to obtain 5-dipropylamino-2-thiophenenecarboxaldehyde with a yield of 80%.

5-dipropylamino-2-thiophenecarboxaldehyde, instead of 5-diethylamino-2-thiophenecarboxaldehyde used in Synthesis Example 1, was reacted with 1-methyl-2,3,3-trimethylpseudoindolium iodide, so that dye D19 of violet powder having the following formula was obtained with an yield of 80%.

The maximum absorption peak ($\lambda_{max}$) of dye D19 was observed by the same method as in Synthesis Example 1. As a result, $\lambda_{max}$ was 597 nm for dye D19.

NMR (DMSO, ppm): 0.94 (t, 6H), 1.66 (s, 6H), 1.72 (m, 4H), 3.60 (t, 4H), 3.66 (s, 3H), 6.06 (d, 1H), 6.78 (d, 1H), 7.26 (t, 1H), 7.42 (s, 1H), 7.42 (t, 1H), 7.62 (d, 1H), 8.02 (d, 1H), 8.38 (d, 1H)

Synthesis Example 20

Dye D20 having the following formula, was obtained in the same way as in Synthesis Example 1, except that dipropylamine and 1,2,3,3-trimethylpseudoindolium perchlorate were used instead of diethylamine and 1,2,3,3-trimethylpseudoindolium iodide were used, respectively. The yield of dye D20 was 85%.

The maximum absorption peak ($\lambda_{max}$) of dye D20 was observed by the same method as in Synthesis Example 1. As a result, $\lambda_{max}$ was 596 nm for dye D20.

NMR (DMSO, ppm): 0.94 (t, 6H), 1.66 (s, 6H), 1.72 (m, 4H), 3.60 (t, 4H), 3.66 (s, 3H), 6.06 (d, 1H), 6.78 (d, 1H), 7.26 (t, 1H), 7.42 (s, 1H), 7.42 (t, 1H), 7.62 (d, 1H), 8.02 (d, 1H), 8.38 (d, 1H)

Synthesis Example 21

Dye D21 having the following formula was obtained with a yield of 85% in the same way as in Synthesis Example 19, except that 5-chloro-1,2,3,3-tetramethylpseudoindolium iodide was used instead of 1-methyl-2,3,3-trimethylpseudoindolium iodide.

The maximum absorption peak ($\lambda_{max}$) of dye D21 was observed by the same method as in Synthesis Example 1. As a result, $\lambda_{max}$ was 600 nm for dye D21.

NMR (DMSO, ppm): 0.94 (t, 6H), 1.66 (s, 6H), 1.72 (m, 4H), 3.62 (s, 3H), 3.62 (t, 4H), 6.04 (d, 1H), 6.84 (d, 1H), 7.40 (d, 1H), 7.46 (d, 1H), 7.74 (s, 1H), 8.04 (d, 1H), 8.34 (d, 1H)

Synthesis Examples 22 through 24

Dyes D22, D23 and D24 having the following formula were obtained in the same way as in Synthesis Example 2, except that 5-chloro-2-methylene-1,3,3-trimethylindoline was used instead of 2-methylene-1,3,3-trimethylindoline, and HCl used in Synthesis Example 2 was replaced by $HClO_4$, $HBF_4$ and $HPF_6$, respectively, for Synthesis Examples 22 through 24. The yields of dyes D22, D23 and D24 were 70%, 75% and 75%, respectively.

In the formula above, Y is $ClO_4$ for dye D22, $BF_4$ for dye D23, and $PF_6$ for dye D24.

The maximum absorption peaks ($\lambda_{max}$) of dyes D22, D23 and D24 were observed by the same method as in Synthesis Example 1. As a result, $\lambda_{max}$ was 600 nm for dye D22, 598 nm for dye D23 and 602 nm for dye D24.

<Dye D22>
NMR (DMSO, ppm): 0.94 (t, 6H), 1.66 (s, 6H), 1.74 (m, 4H), 3.60 (t, 4H), 3.61 (s, 3H), 6.02 (d, 1H), 6.84 (d, 1H), 7.40 (d, 1H), 7.46 (d, 1H), 7.74 (s, 1H), 8.04 (d, 1H), 8.32 (d, 1H)

<Dye D23>
NMR (DMSO, ppm): 0.94 (t, 6H), 1.66 (s, 6H), 1.72 (m, 4H), 3.60 (t, 4H), 3.61 (s, 3H), 6.04 (d, 1H), 6.82 (d, 1H), 7.40 (d, 1H), 7.46 (d, 1H), 7.74 (s, 1H), 8.04 (d, 1H), 8.32 (d, 1H)

<Dye D24>
NMR (DMSO, ppm): 0.94 (t, 6H), 1.66 (s, 6H), 1.72 (n, 4H), 3.60 (t, 4H), 3.61 (s, 3H), 6.02 (d, 1H), 6.82 (d, 1H), 7.40 (d, 1H), 7.46 (d, 1H), 7.74 (s, 1H), 8.02 (d, 1H), 8.34 (d, 1H)

Synthesis Examples 25 through 27

Dyes D25, D26 and D27 having the following formula were obtained by the same way as in Synthesis Example 19, except that 1-methyl-2,3,3-trimethylpseudoindolium iodide was replaced by 5-nitro-2-methylene-1,3,3-trimethylindolium perchlorate, 5-nitro-2-methylene-1,3,3-trimethylindolium tetrafluoroborate, 5-nitro-2-methylene-1,3,3-trimethylindolium hexafluorophosphate for Synthesis Examples 25 through 27, respectively. The yields of dyes D25, D26 and D27 were 70%, 75% and 75%, respectively.

In the formula, Y is $ClO_4$ for dye D25, $BF_4$ for dye D26, and $PF_6$ for dye D27.

The maximum absorption peaks ($\lambda_{max}$) of dyes D25, D26 and D27 were observed by the same method as in Synthesis Example 1. As a result, $\lambda_{max}$ was 608 nm for dye D25, 608 nm for dye D26 and 604 nm for dye D27.

<Dye D25>
NMR (DMSO, ppm): 0.94 (t, 6H), 1.72 (s, 6H), 1.72 (m, 4H), 3.60 (s, 3H), 3.68 (t, 4H), 6.06 (d, 1H), 7.06 (d, 1H), 7.46 (d, 1H), 8.12 (d, 1H), 8.28 (d, 1H), 8.38 (d, 1H), 8.50 (s, 1H)

<Dye D26>
NMR (DMSO, ppm): 0.94 (t, 6H), 1.70 (s, 6H), 1.72 (m, 4H), 3.60 (s, 3H), 3.68 (t, 4H), 6.06 (d, 1H), 7.06 (d, 1H), 7.46 (d, 1H), 8.14 (d, 1H), 8.28 (d, 1H), 8.38 (d, 1H), 8.50 (s, 1H)

<Dye D27>
NMR (DMSO, ppm): 0.94 (t, 6H), 1.70 (s, 6H), 1.72 (m, 4H), 3.60 (s, 3H), 3.68 (t, 4H), 6.06 (d, 1H), 7.06 (d, 1H), 7.46 (d, 1H), 8.14 (d, 1H), 8.28 (s, 1H), 8.38 (d, 1H), 8.48 (s, 1H)

Synthesis Example 28

Dye D28 having the following formula was obtained with a yield 75% by the same way as in Synthesis Example 13, except that dipropylamine was used instead of diethylamine.

The maximum absorption peak ($\lambda_{max}$) of dye D28 was observed by the same method as in Synthesis Example 1. As a result, $\lambda_{max}$ was 618 nm for dye D28.

NMR (DMSO, ppm): 0.94 (t, 6H), 1.72 (m, 4H), 1.92 (s, 6H), 3.60 (t, 4H), 3.80 (s, 3H), 6.12 (d, 1H), 6.76 (d, 1H), 7.52 (t, 1H), 7.66 (t, 1H), 7.76 (d, 1H), 8.02 (d, 1H), 8.08 (d, 1H), 8.10 (d, 1H), 8.26 (d, 1H), 8.46 (d, 1H)

Synthesis Examples 29 and 30

Dyes D29 and D30 having the following formula were obtained by the same way as in Synthesis Example 28, except that 1,2,3,3-tetramethyl-4,5-benzopseudoindolium perchlorate was replaced by 1,2,3,3-tetramethyl-4,5-benzopseudoindolium tetrafluoroborate and 1,2,3,3-tetramethyl-4,5-benzopseudoindolium hexafluorophosphate for Synthesis Examples 29 and 30, respectively. The yield of dyes 29 and 30 was 80%.

In the formula, Y is $BF_4$ for dye 29 and $PF_6$ for dye 30.

The maximum absorption peaks ($\lambda_{max}$) of dyes D29 and D30 were observed by the same method as in Synthesis Example 1. As a result, $\lambda_{max}$ was 618 nm for dye D29 and 619 nm for dye D30.

<Dye D29>

NMR (DMSO, ppm): 0.94 (t, 6H), 1.72 (m, 4H), 1.92 (s, 6H), 3.60 (t, 4H), 3.80 (s, 3H), 6.12 (d, 1H), 6.76 (d, 1H), 7.52 (t, 1H), 7.66 (t, 1H), 7.76 (d, 1H), 8.02 (d, 1H), 8.08 (d, 1H), 8.10 (d, 1H), 8.26 (d, 1H), 8.46 (d, 1H)

<Dye D30>

NMR (DMSO, ppm): 0.94 (t, 6H), 1.72 (m, 4H), 1.92 (s, 6H), 3.60 (t, 4H), 3.80 (s, 3H), 6.12 (d, 1H), 6.76 (d, 1H), 7.52 (t, 1H), 7.66 (t, 1H), 7.76 (d, 1H), 8.02 (d, 1H), 8.08 (d, 1H), 8.10 (d, 1H), 8.26 (d, 1H), 8.46 (d, 1H)

Synthesis Example 31

5-Bromofuraldehyde was dissolved in dimethylsulfoxide (DMSO) and 1–2 drops of Aliquart 336 (tricaprylylmethylammonium chloride, produced by Aldrich Co.) was added to the solution. 10 Equivalents diethylamine was added to the mixture and refluxed for 4 days. The remaining diethylamine was removed from the reaction mixture and subjected to extraction and column chromatography to obtain 5-diethylamino-2-furaldehyde with a yield of 85%.

1.2 Equivalents 5-diethylamino-2-furaldehyde and 1 equivalent 5-chloro-1,2,3,3-tetramethylpseudoindolium per-chlorate were dissolved in ethanol and 1 drop of piperidine was added to the solution while stirring.

The reaction mixture was reacted under reflux for 5 hours, the solvent was removed from the reaction mixture and excess ethylacetate was added to obtain violet precipitate. The precipitate was washed several times, so that dye D31 of violet color, having the following formula, was obtained with a yield of 90%.

The maximum absorption peak ($\lambda_{max}$) of dye D31 was observed by the same method as in Synthesis Example 1. As a result, $\lambda_{max}$ was 594 nm for dye D31.

NMR (DMSO, ppm): 1.28 (t, 6H), 1.64 (s, 6H), 3.50 (s, 3H), 3.74 (q, 4H), 6.04 (d, 1H), 6.36 (d, 1H), 7.28 (d, 1H), 7.41 (d, 1H), 7.60 (d, 1H), 7.67 (d, 1H), 7.90 (s, 1H)

Synthesis Examples 32 and 33

Dyes D32 and D33 having the following formula were obtained by the same way as in Synthesis Example 30, except that 5-chloro-1,2,3,3-tetramethylpseudoindolium perchlorate was replaced by 5-chloro-1,2,3,3-tetramethylpseudoindolium tetrafluoroborate and 5-chloro-1,2,3,3-tetramethylpseudoindolium hexafluorophosphate for Synthesis Examples 32 and 33, respectively. The yield of dyes D32 and D33 was 85%.

In the formula, Y is $BF_4$ for dye D32 and $PF_6$ for D33. The maximum absorption peaks ($\lambda_{max}$) of dyes D32 and D33 were observed by the same method as in Synthesis Example 1. As a result, $\lambda_{max}$ was 594 nm for dye D32 and 595 nm for dye D33.

<Dye D32>

NMR (DMSO, ppm): 1.28 (t, 6H), 1.64 (s, 6H), 3.50 (s, 3H), 3.74 (q, 4H), 6.04 (d, 1H), 6.36 (d, 1H), 7.28 (d, 1H), 7.41 (d, 1H), 7.60 (d, 1H), 7.67 (d, 1H), 7.90 (s, 1H)

<Dye D33>

NMR (DMSO, ppm): 1.28 (t, 6H), 1.64 (s, 6H), 3.50 (s, 3H), 3.74 (q, 4H), 6.04 (d, 1H), 6.36 (d, 1H), 7.28 (d, 1H), 7.41 (d, 1H), 7.60 (d, 1H), 7.67 (d, 1H), 7.90 (s, 1H)

EXAMPLE 1

0.30 g of Dye D9 obtained in Synthesis Example 9 and 0.30 g phenylamine series stabilizer (IRG022, Nippon Kayaku Co., Ltd) were dissolved in 10 ml tetrafluropropanol, and stirred at room temperature for 5 hours. The mixture was filtered with a Teflon filter (having 0.2 μm pore width) and spin-coated over a substrate to form a dye layer. The substrate was a polycarbonate substrate with 0.6 mm thickness having pregrooves with 145 nm depth, 30 nm width and 800 nm track pitch.

The substrate having the dye layer was dried in a vacuum oven set at 40° C. for 12 hours. Then, silver (Ag) was deposited over the dye layer to form a reflective layer with a thickness of 100 nm. An acrylic UV curable resin was spin coated over the reflective layer and then cured by radiation of UV rays to form a protecting layer. The resultant substrate was combined with a dummy disk, thereby completing an optical disk.

EXAMPLES 2 THROUGH 5

Optical disks were manufactured by the same way as in Example 1, except that dyes D13, D16, D22 and D31 were used instead of dye D9 for Examples 2 through 5.

Comparative Examples 1 through 5

Optical disks were manufactured by the same way as in Example 1, except that cyanine series dyes, NK4321 (Hayashibara Biochemical Laboratories, INC.), NK4422 (Hayashibara Biochemical Laboratories, INC.), OM78 (Fuji Photo Film Co., LTD), NK4499 (Hayashibara Biochemical Laboratories, INC) and NK4500 (Hayashibara Biochemical Laboratories, INC.), were used for Comparative Examples 1 through 5, respectively.

The characteristics the optical disks manufactured in Examples 1 through 5 and Comparative Examples 1 through 5 was evaluated by a DVD-R recorder (DVDR-S101, Pioneer), a dynamic characteristic evaluator (DDU-1000, Pulstec) equipped with a laser diode (LD, Nichia, Japan) having a peak wavelength of 630 nm or 650 nm, and a DVD player (DVD909, Samsung, Korea). The before-recording characteristic of the optical disks was evaluated using the dynamic characteristic evaluator equipped with 635 nm LD. The results are shown in Table 1. In Table 1, Rg indicates the reflectivity from pregrooves, Rl indicates the reflectivity from lands, P-P indicates the push-pull characteristic, Rtop indicates the maximum reflectivity, the jitter indicates variations of reproduction signals, which is a signal uniformity index, I14/I14H indicates the modulated amplitude of recorded signals.

TABLE 1

| Example | Rg (%) | Rl (%) | P-P | Rtop (%) | Jitter (%) | I14/I14H |
|---|---|---|---|---|---|---|
| Example 1 | 47 | 51 | 0.29 | 56 | 7.8 | 0.72 |
| Example 2 | 45 | 48 | 0.25 | 51 | 8.1 | 0.67 |
| Example 3 | 47 | 53 | 0.33 | 54 | 7.9 | 0.70 |
| Example 4 | 51 | 56 | 0.23 | 59 | 7.5 | 0.69 |
| Example 5 | 48 | 51 | 0.24 | 54 | 8.0 | 0.66 |
| Comparative Example 1 | 64.1 | 66 | 0.33 | 62 | 13 | 0.50 |
| Comparative Example 2 | 56 | 59 | 0.30 | 55 | 12 | 0.58 |
| Comparative Example 3 | 56 | 59 | 0.33 | 54 | 9.6 | 0.62 |
| Comparative Example 4 | | | | unrecordable | | |
| Comparative Example 5 | | | | unrecordable | | |

As shown in Table 1, the recording characteristics, including jitter, of the optical disks of Examples 1 through 5, which were evaluated using the DVD-R recorder, are better than those of Comparative Examples 1. Also, the reproduction characteristics of Examples 1 through 5, evaluated with the DVD player, ensures that the optical disks are compatible with DVD players. Apparently, the optical characteristics of the optical disks of Comparative Examples are unsuitable for recording.

As previously mentioned, the hemicyanine dye having formula (1) above is easy to synthesize with high yield. Thus, use of the hemicyanind dye as an optical recording medium is advantageous in terms of the manufacturing costs. A WORM type optical recording medium using the hemicyanine dye has improved recording characteristics in terms of jitter and modulation factor, compared with a conventional optical recording material.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A hemicyanine dye having formula (1):

(1)

wherein Z is a benzene ring, naphthalene ring or anthracene ring; $X_1$ is S, O, Se, NR or $C(CH_3)_2$; $X_2$ is S, NR of O, where R is hydrogen or an alkyl group of 1 to 5 carbon atoms; $R_1$ is hydrogen, halogen atoms, an alkyl group of 1 to 3 carbon atoms or a nitro group; each of $R_2$ and $R_5$ is an alkyl group of 1 to 5 carbon atoms; each of $R_3$ and $R_4$ is hydrogen, an hydroxy group, an alkyl group of 1 to 4 carbon atoms, halogen atoms or a halide; Y is Cl, Br, I, $ClO_4$, $BF_4$, $BrO_4$, $PF_6$, $CH_3SO_3$, $CF_3SO_3$, $4\text{-}CH_3C_6H_4SO_3$, $C_6H_5SO_3$, $6\text{-}SO_3C_{10}H_6SO_3$ or $HSO_4$; n is an integer of 0–2; and m is an integer of 1-2.

2. The hemicyanine dye of claim 1, wherein the hemicyanine dye having formula (1) is a compound having formula (2) or (3):

(2)

wherein $R_1$ is H, $NO_2$ or Cl; $R_2$ is $CH_3$, $C_2H_5$, $C_3H_7$ or $C_4H_9$; $X_1$ is $C(CH_3)_2$ or S; $X_2$ is O or S; $R_5$ is $C_2H_5$, $C_3H_7$ or $C_4H_9$; and Y is $ClO_4$, $BF_4$, $PF_6$, I, Br or Cl, and (3)

wherein $X_1$ is $C(CH_3)_2$ or S; $X_2$ is S; $R_2$ is $CH_3$, $C_2H_5$, $C_3H_7$ or $C_4H_9$; $R_5$ is $C_2H_5$, $C_3H_7$ or $C_4H_9$; and Y is $ClO_4$, $BF_4$, $PF_6$, I, Br or Cl.

3. An optical recording medium comprising a transparent substrate with grooves, a recording layer including a laser absorptive dye, formed over the transparent substrate, and a reflective layer and a protective layer formed over the recording layer, wherein the dye of the recording layer is a hemicyanine dye having formula (1):

(1)

wherein Z is a benzene ring, naphthalene ring or anthracene ring; $X_1$ is S, O, Se, NR or $C(CH_3)_2$; $X_2$ is S, NR of O, where R is hydrogen or an alkyl group of 1 to 5 carbon atoms; $R_1$ is hydrogen, halogen atoms, an alkyl group of 1 to 3 carbon atoms or a nitro group; each of $R_2$ and $R_5$ is an alkyl group of 1 to 5 carbon atoms; each of $R_3$ and $R_4$ is hydrogen, an hydroxy group, an alkyl group of 1 to 4 carbon atoms, halogen atoms or a halide; Y is Cl, Br, I, $ClO_4$, $BF_4$, $BrO_4$, $PF_6$, $CH_3SO_3$, $CF_3SO_3$, 4-$CH_3C_6H_4SO_3$, $C_6H_5SO_3$, 6-$SO_3C_{10}H_6SO_3$ or $HSO_4$; n is an integer of 0–2: and m is an integer of 1–2.

4. The optical recording medium of claim 3, wherein the hemicyanine dye having formula (1) is a compound having formula (2) or (3):

(2)

wherein $R_1$ is H, $NO_2$ or Cl; $R_2$ is $CH_3$, $C_2H_5$, $C_3H_7$ or $C_4H_9$; $X_1$ is $C(CH_3)_2$ or S; $X_2$ is O (3)

or S; $R_5$ is $C_2H_5$, $C_3H_7$ or $C_4H_9$; and Y is $ClO_4$, $BF_4$, $PF_6$, I, Br or Cl, and wherein $X_1$ is $C(CH_3)_2$ or S; $X_2$ is S; $R_2$ is $CH_3$, $C_2H_5$, $C_3H_7$ or $C_4H_9$; $R_5$ is $C_2H_5$, $C_3H_7$ or $C_4H_9$; and Y is $ClO_4$, $BF_4$, $PF_6$, I, Br or Cl.

5. The optical recording medium of claim 3, wherein the hemicyanine dye having formula (1) shows a maximum absorption in the wavelength range of 350–650 nm, and has a reflective index of 1.8–2.3 in the wavelength range of 400–700 nm.

6. The optical recording medium of claim 3, wherein the substrate has a transmittance of 70–99%, and a thickness of 0.01–10 mm.

* * * * *